United States Patent Office 3,702,848
Patented Nov. 14, 1972

3,702,848
PROCESS FOR THE CONVERSION OF 3-ENOL ETHERS OF 3-KETO-$\Delta^4$-STEROIDS UNSUBSTITUTED AT $C_4$ AND $C_6$ TO THE CORRESPONDING 3 - KETO - $\Delta^4$-$6\beta$ - (N-DISUBSTITUTED)AMINOMETHYL COMPOUNDS
Verlan H. Van Rheenen, Kalamazoo, Mich., assignor to The Upjohn Company, Kalamazoo, Mich.
No Drawing. Filed Nov. 19, 1969, Ser. No. 878,217
Int. Cl. C07c *113/10*
U.S. Cl. 260—239.5                                                   9 Claims

ABSTRACT OF THE DISCLOSURE

This invention relates to a novel and general process for the conversion of the 3-enol ethers (1) of 3-keto-$\Delta^4$-steroids, unsubstituted at the 4 and 6 positions, of the androstane, 19-norandrostane, pregnane, 19-norpregnane, stigmastane and spirostane series into the corresponding 3-keto-$\Delta^4$-$6\beta$-(N-disubstituted) aminomethyl derivatives (III). The compounds of Formula III have anabolic, androgenic, anti-fertility, anti-inflammatory and estrogenic activities, and are consequently useful in treating mammals, including humans, birds and other animals in those conditions and/or ailments where such activities are desired. For example, in preventing pregnancy, increasing pelt size in female mink, treating arthritis, osteoporosis, etc. The compounds of Formula III are additionally useful as intermediates in the preparation, by known methods, of the physiologically active and therapeutically useful 6-methyl steroids, such as medroxyprogesterone acetate ($6\alpha$-methyl-$17\alpha$-hydroxy - 4 - pregnene - 3,20 - dione-17-acetate), dimethisterone [$6\alpha$-methyl-$17\beta$-hydroxy-$17\alpha$-(1-propynyl)-4-androsten - 3 - one], methylprenisolone ($6\alpha$-methyl-$11\beta$,$17\alpha$,21-trihydroxy - 1,4 - pregnadiene - 3,20-dione), fluoromethylone ($6\alpha$-methyl-$9\alpha$-fluoro-$11\beta$,$17\alpha$-dihydroxy-1,4-pregnadiene-3,20-dione), etc.

BRIEF SUMMARY OF THE INVENTION

The present invention provides a process for the preparation of 3-keto - $\Delta^4$ - $6\beta$-(N-disubtituted)aminomethyl steroids of the androstane, 19-norandrostane, pregnane, 19-norpregnane, stigmastane and spirostane series having in rings A and B of the steroid nucleus the structure:

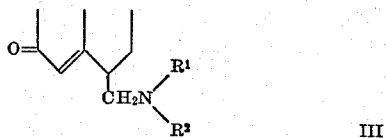

III wherein $R^1$ and $R^2$ are independently selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, and $R^1$, $R^2$ and N when taken together form a secondary cyclic alkylene amino group containing from five through seven members, which process comprises mixing a corresponding secondary amine of the formula:

II wherein $R^1$ and $R^2$ have the same meaning as above, with formaldehyde, a strong acid and a corresponding steroid compound having in rings A and B of the steroid nucleus the structure:

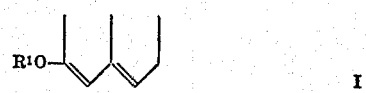

I wherein $R^1$ has the same meaning as above.

Androstane series is defined herein as those compounds containing the carbon atoms skeleton:

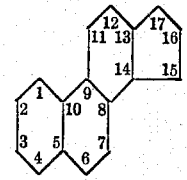

in which each of the carbon-carbon linkages can lie either single or double bonded, and which can have carbon and/or other atoms as substituents attached to the carbon atoms skeleton.

19-norandrostane series is defined herein as those compounds that differ from androstane series compounds in that the former lack the methyl group at $C_{19}$ attached to $C_{10}$ that characterizes the latter.

Pregnane series is defined herein as those compounds containing the carbon atoms skeleton:

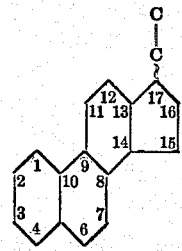

in which each of the carbon-carbon linkages can be either single or double bonded, and which can have carbon, and/or other atoms as substituents attached to the carbon atom skeleton.

19-norpregnane series is defined herein as those compounds that differ from pregnane series compounds in that the former lack the methyl group at $C_{19}$ attached to $C_{10}$ that characterizes the latter.

Stigmastane series is defined herein as those compounds containing the carbon atom skeleton:

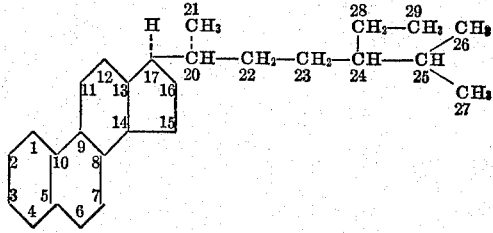

Spirostane series is defined herein as those compounds containing the carbon atom skeleton:

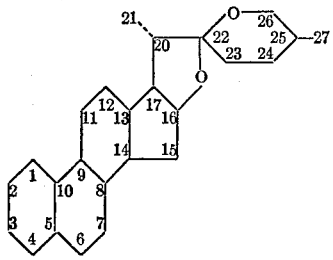

Examples of alkyl of from one through twelve carbon atoms are methyl, ethyl, propyl, butyl, pentyl, hexyl, heptyl, octyl, nonyl, decyl, undecyl and dodecyl and the isomeric forms thereof. Examples of hydroxyalkyl of from one through twelve carbon atoms are hydroxymethyl, hydroxyethyl, hydroxypropyl, hydroxybutyl, hydroxypentyl, hydroxyhexyl, hydroxyheptyl, hydroxyoctyl, hydroxynonyl, hydroxydecyl, hydroxyundecyl and hydroxydodecyl and the isomeric forms thereof. Examples of cycloalkyl are cyclopropyl, cyclobutyl, cyclopentyl, cyclohexyl, cycloheptyl, cyclooctyl, 2 - methylcyclobutyl, 2,3 - diethylcyclobutyl, 4 - propylcyclobutyl, 3 - cyclopentylpropyl, etc. Examples of aryl are phenyl, diphenyl, naphthyl, anthryl, etc. Examples of alkaryl are tolyl, xylyl, 2,4,6 - triethylphenyl, 3 - butylxylyl, 5 - hexyltolyl, 2 - propyl - 3 - octyl-naphthyl, 2-pentyl-4-decylnaphthyl, 3 - decyl - 5 - anthryl, etc., and the isomeric forms thereof. Examples of aralkyl are benzyl, phenethyl, α-phenylpropyl, α-naphthylbutyl, β-anthrylpropyl, etc., and the isomeric forms thereof.

The 6β-(N-disubstituted)aminomethylation process of this invention is generally applicable to the enolic derivatives of 3-keto-Δ⁴-steroids. It can be successfully applied to androstane, 19-norandrostane, 9β,10α-androstane, pregnane, 19-norpregnane, 9β,10α-pregnane, spirostane, cholestane, ergostane and stigmastane series compounds. The foregoing starting compounds can contain the substituents listed below:

Hydroxyl groups and functional derivatives thereof in such positions of the steroid nucleus as 11, 12, 14, 15, 16 (including 16-hydroxymethyl), 17, 18, 20 and 21 (including the condensation products of 16α,17α-glycols with carbonyl components), Carbonyl groups such as at $C_{11}$, $C_{12}$, $C_{15}$, $C_{16}$, $C_{17}$, $C_{18}$, $C_{19}$ and $C_{20}$, Carbalkoxy groups at $C_{13}$, $C_{16}$ and $C_{17}$, or in the side chain, Alkyl groups other than at $C_4$ and $C_6$, especially at $C_2$, $C_{11}$, $C_{16}$, $C_{17}$ and $C_{21}$, Vinyl, allyl, alkynyl and haloalkynyl groups at $C_{17}$, Methylene and ethylidene groups at $C_{11}$, $C_{16}$, $C_{17}$ and $C_{16}-C_{17}$, Lactone, ether and spiroketal residues such as —O·CO·CH₂— attached to $C_{17}$, etheric groups at $C_{16}$, and bridging $C_{18}$ and $C_{20}$; spiroketal moieties such as are present in diosgenone and spirostane, Chlorine, bromine or fluorine substituents in rings C or D or in the side chain, Unsaturated linkages at $C_{1(2)}$, $C_{9(11)}$, $C_{11}$, $C_{14}$, $C_{16}$ and $C_{17(20)}$, Ketol groups at $C_{11}-C_{12}$, $C_{16}-C_{17}$, $C_{17}-C_{20}$ and $C_{20}-C_{21}$, Epoxides at $C_{16}-C_{17}$, Corticoid side chains which can be acylated, diacylated, condensed with carbonyl components such as formaldehyde or acetone (as 2,2-dimethoxypropane) or with ester components such as ethyl orthoformate, ethyl acetoacetate or other functional derivatives thereof as are known to those skilled in the steroid art.

The process of this invention can be used for the 6-(N-disubstituted)aminomethylation of 3-enol ethers (and acyl derivatives thereof) derived from such 3-keto-4-enes (I) as those that follow: testosterone, 2-methyltestosterone, 17α-methyltestosterone, 9(11) - dehydro - 17α-methyltestosterone, 17α-propynyltestosterone, 17α - acyloxyprogesterone, 9(11)-dehydro-17α - acyloxyprogesterone, 16-methyl-17α-acyloxyprogesterone, 9(11)-dehydro-16-methyl-17α-acyloxyprogesterone, 16-methylene - 17α-acyloxyprogesterone, 9(11)-dehydro-16-methylene - 17α-acyloxyprogesterone, 17α - acyloxy - 16 - ethylideneprogesterone, 16α,17α - dimethylmethylenedioxyprogesterone, 9(11)-dehydro-16α,17α-dimethylmethylenedioxyprogesterone, cortisone, 16-methylcortisone, 21-methylcortisone, 16-methylenecortisone, 16α-hydroxy cortisone and the (16α,17α)-acetonide thereof, hydrocortisone, 16-methylhydrocortisone, 21 - methylhydrocortisone, 16-methylenehydrocortisone, 16α - hydroxyhydrocortisone and the (16α,17α)-acetonide thereof, 17α,21-dihydroxypregna-4,9(11)-diene-3,20-dione, 16-methyl-17α,21 - dihydroxypregna-4,9(11)-diene-3,20 - dione, 21 - methyl-17α,21-dihydroxypregna-4,9(11)-diene-3,20 - dione, 16-methylene-17α,21-dihydroxypregna-4,9(11)-diene - 3,20-dione, 16α-hydroxy-17α,21 - dihydroxypregna - 4,9(11)-diene-3,20-dione and the (16,17)-acetonide thereof, 21-fluoro-17α-hydroxypregna-4,9(11)-diene-3,20 - dione and the (16,17)-acetonide thereof, 21 - fluoro-17α - hydroxypregn-4-ene-3,11-20-trione and the (16,17)-acetonide thereof, 21-fluoro-11,17α-dihydroxypregn - 4 - ene-3,20-dione and the (16,17)-acetonide thereof, 21-hydroxypregna-4,17-dien-3-one, 11-oxo-21-hydroxypregna - 4,17-dien-3-one, 11,21-dihydroxypregna-4,17-dien - 3 - one, 9(11)dehydro-21-hydroxypregna-4,17-dien-3-one, 3 - oxopregna-4,17(20)-dien-21-oic acid (esters), 3,11-dioxopregna-4,17(20)-dien-21-oic acid (esters), 11-hydroxy-3-oxopregna-4,17(20)-dien-21-oic acid (esters) 9(11)-dehydro-3-oxopregna-4,17(20)-dien - 21 - oic acid (esters), 21-fluoro - 17α - acyloxyprogesterone, progesterone, 16-methylprogesterone, 11-oxoprogesterone, 9(11)-dehydroprogesterone, 21-methylprogesterone, diosgenone, 17α-cyano-17β-hydroxyandrost-4-en-3-one, 16-methyl - 16,17-dehydroprogesterone, 16 - cyano-progesterone, 16 - carbalkoxyprogesterone, 16 - hydroxymethylprogesterone, 3-(3-oxo-17β-hydroxy-androst-4-en-17α - yl)propionic acid, 21-fluoroprogesterone, testololactone, 16 - fluoro - corticoids, 17α-hydroxyprogesterone, 3,11-dioxopregna-1,4,17 (20)-trien-21-oci acid (esters), 1-methoxy - 3,11 - dioxopregna-4,17(20)-dien-21-oic acid (esters), 11α (and β), 17α-dihydroxy progesterone, 11-oxo-17α-hydroxy progesterone, 3-oxo - 11β,21 - dihydroxypregna - 4,17(20)-diene (21-acetate) and 3-oxo-11β-21-dihydroxypregna-1,4,17(20)-triene (21-acetate). The 9α-fluoro derivatives of the above 11β-hydroxy and 11-keto steroids.

It is well known in the steroid art that the introduction of a 6-methyl group into a steroid molecule often imparts significant biological activity to the thus methylated compound. Consequently, the 6β-(N-disubstituted)aminomethyl steroids (III) prepared by the process of this invention can be advantageously employed as precursors of 6-methyl steroids by the following methods:

(1) By alkylating the tertiary amine group with an alkylating agent such as methyl iodide or dimethylsulfate followed by elimination to yield a 6-methylene derivative which can be reduced by transfer hydrogenation in accordance with the method described in Tetrahedron 21, 1619, to yield a corresponding 6-methyl steroid.

(2) By preparing the N-oxide from the corresponding tertiary amine (by reaction with hydrogen peroxide), followed by elimination and hydrogenation as in (1), above.

(3) By treating the corresponding steroidal tertiary amine, in which $R^1$ and/or $R^2$ is an aromatic residue, with strong mineral acid to yield a 6-methylene derivative which can be hydrogenated as in (1), above.

In carrying out the process of the present invention (I+II+formaldehyde→III), a compound of Formula I in a solvent (such as methanol, ethanol, propanol, isopropanol, t-butanol, tetrahydrofuran, dioxane, 1,2-dimethoxyethane, etc.) has a secondary amine (II) (as the free base or its acid salt, e.g., the hydrochloride, sulfate or p-toluenesulfonate), formaldehyde (in the form of a 20 to 40% aqueous solution or as paraformaldehyde) and a strong acid added thereto and the reaction mixture maintained at ambient to reflux temperature, to give the 3-keto-$\Delta^4$-6$\beta$-(N - disubstituted)aminomethyl counterpart (III).

The reaction of a compound of Formula I with a secondary amine (II) and formaldehyde is catalyzed by the secondary amine salt. When tetrahydrofuran is the solvent, negligible reaction occurs in the absence of amine salt; but when a strong acid (e.g., p-toluenesulfonic, hydrochloric, sulfuric or nitric acid) is added to the reaction mixture, the formation of the 3-keto-$\Delta^4$-6$\beta$-(N-disubstituted)-aminomethyl product (III) proceeds readily. Increasing the amount of acid hastens completion of the reaction; e.g., in Example 1, below, the reaction required 100 hours for completion when 10 mg. of p-toluenesulfonic acid was employed, but only 3 hours when the amount of this acid was raised to 1.5 g. The molar amount of secondary amine (II) must exceed the amount of acid (hence amine salt) added to insure that the reaction is maintained at a basic pH.

The molar equivalents of secondary amine (II) and formaldehyde must be equal to or greater than that of the starting steroid (I). The molecular ratios of the compound of Formula I, the secondary amine of Formula II and formaldehyde can be varied, molar ratios of about 1:1:1 up to those wherein the amine (II) and formaldehyde are about twenty times that of the starting steroid compound (I), are satisfactory. Since formaldehyde is quite volatile and the reaction time relatively long, a large excess can be added initially or additional formaldehyde added periodically during the course of the reaction. This also applies to the secondary amine (II), particularly when it is a volatile one like dimethylamine.

The choice of solvent is dictated to some extent by the solubility of the starting enol ether (I) in that solvent. Alcohols such as those listed above can be employed, but polar aprotic solvents such as tetrahydrofuran, dioxane and 1,2-dimethoxyethane are the most efficient.

Since the steroidal enol ether (1) is sensitive to acid, the reaction must be carried out under basic conditions. The secondary amine (II) can be employed as the free base or if an acid salt (e.g., the hydrochloride, sulfate or p-toluenesulfonate) of the amine is used, some of the free amine is added to the reaction mixture to make certain that the reaction remains at an alkaline pH value. Straight chain secondary amines (II) such as dimethylamine, methylethylamine, diethylamine, ethylbutylamine, etc., or cyclic (e.g., piperidine, substituted piperidines such as 3-propylpiperidine, 2,4-dimethylpiperidine, 2-ethyl-6-methylpiperidine, pyrrolidine, substituted pyrrolidines such as 2-methylpiperidine, 2,3-diethylpyrrolidine, etc.) aliphatic secondary amines (II) can be used. Aromatic secondary amines (II) such as diphenylamine, methylphenylamine, N-methylaniline, N-ethylaniline, N-methyl-p-toluidine, etc., can also be employed.

The time required for the completion of the reaction depends upon such factors as the type of secondary amine, the particular starting steroid (I), its solubility, its relative amount in relation to secondary amine (II) and formaldehyde, thoroughness of mixing, solvent and the like. Therefore it will be understood that the optimum reaction time will vary for each set of reaction conditions. Ordinarily, the reaction will go to completion within from about 30 minutes to about five days.

After completion of the reaction between I, II and formaldehyde, the thus formed 6$\beta$-(N-disubstituted) aminomethyl product (III) is readily isolated in high yield from the reaction mixture by conventional means; for example, by evaporating the solvent, dissolving the residue in a solvent (such as benzene), extracting the solution with water, then dilute acid, neutralizing the acid phase with dilute alkali (e.g., sodium carbonate) and extracting with a solvent such as methylene chloride, washing the methylene chloride layer with dilute hydrochloric acid, dilute sodium carbonate solution, then drying and evaporating the methylene chloride to give a high yield of product (III).

DETAILED DESCRIPTION

It is to be understood that the invention is not to be limited to the exact details of operation or exact compounds shown and described herein, as obvious modifications and equivalents will be apparent to one skilled in the art, and the invention is therefore to be limited only by the scope of the appended claims.

EXAMPLE 1

6$\beta$-piperidinomethyl-17$\alpha$-hydroxy-4-pregnene-3,20-dione 17-acetate (III)

To a solution of 3 g. of 17$\alpha$-hydroxy-3-methoxy-3,5-pregnadien-20-one 17-acetate (I) in 30 ml. of tetrahydrofuran, 1.5 ml. of piperidine (II), 0.5 ml. of 37% Formalin and 10 mg. of p-toluenesulfonic acid is added. This solution is refluxed on a steam bath for about 100 hours. During the reflux period, increments totaling 3 ml. of 37% Formalin and 2 ml. of piperidine are added. The tetrahydrofuran is evaporated and the resulting residue extracted with benzene. The benzene solution is extracted with water and then with 0.2 N sulfuric acid. The acid phase is neutralized with dilute sodium carbonate solution and then extracted with methylene chloride. The methylene chloride layer is washed with dilute hydrochloric acid solution, dilute sodium carbonate solution, dried and the solvent evaporated to give a high yield of 6$\beta$-piperidinomethyl-17$\alpha$-hydroxy-4-pregnene - 3,20-dione 17-acetate (III).

Following the procedure of Example 1 but using 1.5 g. of p-toluenesulfonic acid instead of 10 mg. thereof, the reaction producing 6$\beta$ - piperidinomethyl-17$\alpha$-hydroxy-4-pregnene-3,20-dione 17-acetate (III) is complete in 3 hours.

Following the procedure of Example 1 and the paragraph thereafter but substituting other compounds of Formula II, such as (1) 2-propylpiperidine (II),
(2) 2,6-dimethylpiperidine (II),
(3) 2-ethyl-6-methylpiperidine (II),
(4) pyrrolidine (II),
(5) 3-ethylpyrrolidine (II),
(6) 2,4-dimethylpyrrolidine (II),
(7) dimethylamine (II),
(8) ethylbutylamine (II), etc., yields, respectively, (1) 6$\beta$-(2-propyl piperidinomethyl)-17$\alpha$-hydroxy-4-pregnene-3,20-dione 17-acetate (III),
(2) 6$\beta$-(2,6-dimethyl piperidinomethyl)-17$\alpha$-hydroxy-4-pregnene-3,20-dione 17-acetate (III),
(3) 6$\beta$-(2-ethyl-6-methyl piperidinomethyl)-17$\alpha$-hydroxy-3,20-dione 17-acetate (III),
(4) 6$\beta$-pyrrolidinomethyl-17$\alpha$-hydroxy-4-pregnene-3,20-dione 17-acetate (III),
(5) 6$\beta$-(3-ethylpyrrolidinomethyl)-17$\alpha$-hydroxy-4-pregnene-3,20-dione 17-acetate (III),
(6) 6$\beta$-(2,4-dimethylpyrrolidinomethyl)-17$\alpha$-hydroxy-4-pregnene-3,20-dione 17-acetate (III),
(7) 6$\beta$-dimethylaminomethyl-17$\alpha$-hydroxy-4-pregnene-3,20-dione 17-acetate (III),
(8) 6$\beta$-ethylbutylaminomethyl-17$\alpha$-hydroxy-4-pregnene-3,20-dione 17-acetate (III), etc.

EXAMPLE 2

6$\beta$-(2-propylpiperidinomethyl)-11$\beta$,17$\alpha$,21-trihydroxy-4-pregnene-3,20-dione 17-valerate (III)

Following the procedure of Example 1 and the paragraphs thereafter but substituting 1,3-dibutoxy-11$\beta$,17$\alpha$, 21-trihydroxy-3,5-pregnadien-20-one 17-valerate (I) and 2-propylpiperidine (II) for the starting material (I) and secondary amine (II) employed therein, yields 6β-(2-propylpiperidinomethyl)-11β,17α,21 - trihydroxy - 4-pregnene-3,20-dione 17-valerate (III).

EXAMPLE 3

*6β-(2,6-dimethylpiperidinomethyl)-3-keto-1,4,17(20)-pregnatrien-21-ethyl-oate (III)*

Following the procedure of Example 2 but substituting 3-cyclopentyloxy-1,3,5,17(20)-pregnatetraene - 21-ethyl-oate (II) and 2,6-dimethylpiperidine (II) yields 6β-(2,6-dimethylpiperidinomethyl) - 3 - keto-1,4,17(20)-pregnatrien-21-ethyl-oate (III).

EXAMPLE 4

*6β-(hexamethyleneiminomethyl)-17α,21-dihydroxy-1,4-pregnadiene-3,11,20-trione 21-butyrate (III)*

Following the procedure of Example 2 but substituting 3 - (β-hydroxypropoxy) - 17α,21-dihydroxy-1,3,5-pregnatriene-11,20-dione 21-butyrate (I) and hexamethyleneimine (II), yields 6-hexamethyleneiminomethyl)-17α,21-dihydroxy-1,4-pregnadiene - 3,11,20 - trione 21-butyrate (III).

EXAMPLE 5

*6β-pyrrolidinomethyl-17α-methyl-17β-hydroxy-4-androsten-3-one 17-propionate (III)*

Following the procedure of Example 2 but substituting 3-benzyloxy - 17α-methyl-17β-hydroxy-3,5-androstadiene 17-propionate (I) and pyrrolidine (II), yields 6β-pyrrolidinomethyl-17α-methyl - 17β - hydroxy-4-androsten-3-one 17-propionate (III).

EXAMPLE 6

*6β-(3-ethylpyrrolidinomethyl)-17α-hydroxy-4-pregnene-3,20-dione (III)*

Following the procedure of Example 2 but substituting 3-ethoxy-17α - hydroxy - 3,5 - pregnadien-20-one (I) and 3-ethyl-pyrrolidine, yields 6β-(3-ethylpyrrolidinomethyl)-17-hydroxy-4-pregnene-3,20-dione (III).

EXAMPLE 7

*6β-(2,4-dimethylpyrrolidinomethyl)-4-pregnene-3,11,20-trione (III)*

Following the procedure of Example 2 but substituting 3-naphthoxy-3,5-pregnadiene - 11,20 - dione (I) and 2,4-dimethylpyrrolidine (II), yields 6β-(2,4-dimethylpyrrolidinomethyl)-4-pregnene-3,11,20-trione (III).

EXAMPLE 8

*Methyl 6β-dimethylaminomethyl-3,11-dioxo-1,4,17-(20)-pregnatriene-21-oate (III)*

Following the procedure of Example 2 but substituting methyl 1α,3-dimethoxy-3,5,17(20)-pregnatrien-11-one 21-oate (I) and dimethyl-amine (II), yields methyl 6β-dimethylaminomethyl-3,11-dioxo - 1,4,17(20)-pregnatriene-21-oate (III).

EXAMPLE 9

*6β-ethylbutylaminomethyl-4-androstene-3,17-dione (III)*

Following the procedure of Example 2 but substituting 3-phenoxy-3,5-androstadien-17-one (I) and ethylbutylamine (II), yields 6β-ethylbutylaminomethyl-4-androstene-3,17-dione (III).

EXAMPLE 10

*6β-(2-propylpiperidinomethyl)-17α-ethynyl-17β-hydroxy-4-androsten-3-one (III)*

Following the procedure of Example 2 but substituting 3-hexyloxy - 17α - ethynyl-17β-hydroxy-3,5-androstadiene (I) and 2-propylpiperidine (II), yields 6β-(2-propylpiperidinomethyl)-17α-ethynyl-17β-hydroxy - 4 - androsten - 3-one (III).

EXAMPLE 11

*6β-(2,6-dimethylpiperidinomethyl)-25D-spirosta-4-en-3-one (III)*

Following the procedure of Example 2 but substituting 3-(3-propylphenoxy)-25D-spirosta-3,5-diene (I) and 2,6-dimethylpiperidine (II), yields 6β-(2,6-dimethylpiperidinomethyl)-25D-spirosta-4-en-3-one (III).

EXAMPLE 12

*6β-(2-ethyl-6-methylpiperidinomethyl)-11β,17α,21 - trihydroxy-4-pregnene-3,20-dione 17α,21-acetonide (III)*

Following the procedure of Example 2 but substituting 3-phenoxy-11β,17α,21 - trihydroxy-3,5-pregnadien-20-one 17α,21-acetonide (I) and 2-ethyl-6-methylpiperidine (II), yields 6β-(2-ethyl-6-methylpiperidinomethyl)-11β,17α,21-trihydroxy-4-pregnene-3,20-dione 17α,21-acetonide (III).

EXAMPLE 13

*6β-pyrrolidinomethyl-17β-hydroxy-17α-vinyl-1,4-androstadien-3-one (III)*

Following the procedure of Example 2 but substituting 3-butoxy-17β-hydroxy-17α-vinyl-1,3,5 - androstatriene (I) and pyrrolidine (II), yields 6β-pyrrolidino-17β-hydroxy-17α-vinyl-1,4-androstadien-3-one (III).

EXAMPLE 14

*6β-(3-ethylpyrrolidinomethyl)-17α,21-methoxymethylenedioxy-4-pregnene-3,11,20-trione (III)*

Following the procedure of Example 2 but substituting 3-(3-butylphenoxy) - 17α,21-methoxymethylenedioxy-3,5-pregnadiene-11,20-dione (I) and 3-ethylpyrrolidine (II), yields 6β-(3 - ethylpyrrolidinomethyl) - 17α,21 - methoxymethylenedioxy-4-pregnene-3,11,20-trione (III).

EXAMPLE 15

*6β-(di-N-propylaminomethyl)-4-pregnen-18-oic acid (18→20)lactone-3-one (III)*

Following the procedure of Example 2 but substituting 3-(2 - propylnaphthoxy) - 3,5 - pregnadien - 18 - oic acid (18→20)lactone (I) and dipropylamine (II), yields 6β-(di - N - propylaminomethyl) - 4 - pregnen - 18 - oic acid (18→20)lactone-3-one (III).

EXAMPLE 16

*6β-dimethylaminomethyl-16α,17α-isopropylidenedioxy-4-pregnene-3,20-dione (III)*

Following the procedure of Example 2 but substituting 3-tolyloxy-16α,17α-isopropylidenedioxy - 3,5 - pregnadien-20-one (I) and dimethylamine (II), yields 6β-dimethylaminomethyl-16α,17α-isopropylidenedioxy - 4 - pregnene-3,20-dione (III).

EXAMPLE 17

*6β-piperidinomethyl-16-methyl-4,16-pregnadiene-3,20-dione (III)*

Following the procedure of Example 2 but substituting 3-methoxy-16-methyl-3,5,16-pregnatrien-20-one (I) and piperidine (II), yields 6β-piperidinomethyl-16-methyl-4,16-pregnadiene-3,20-dione (III).

EXAMPLE 18

*6β-(2-propylpiperidinomethyl)-17β-hydroxy-19-nor-4-androsten-3-one 17-propionate (III)*

Following the procedure of Example 2 but substituting 3-propoxy-17β-hydroxy-19-nor-3,5-androstadiene 17 - propionate (I) and 2-propylpiperidine (II), yields 6β-(2-propylpiperidinomethyl)-17β-hydroxy - 19 - nor-4-androsten-3-one 17-propionate (III).

EXAMPLE 19

*6β-(2,6-dimethyl)piperidinomethyl-20β-hydroxy-4-pregnen-3-one 20-propionate (III)*

Following the procedure of Example 2 but substituting 3-decoxy-20β-hydroxy-3,5-pregnadiene 20-propionate (I) and 2,6-dimethylpiperidine (II), yields 6β-(2,6-dimethyl) piperidinomethyl-20β-hydroxy-4-pregnen-3-one 20-propionate (III).

EXAMPLE 20

*6β-(methyl ethylaminomethyl) - 17α,21 - dihydroxy-11β-formyloxy-4-pregnene-3,20-dione 21-acetate (III)*

Following the procedure of Example 2 but substituting 3-octoxy-17α,21 - dihydroxy - 11β - formyloxy-3,5-pregnadien-20-one 21-acetate (I) and methyl ethyl amine (II), yields 6β-(methyl ethyl aminomethyl)-17α,21-dihydroxy-11β-formyloxy-4-pregnene-3,20-dione 21-acetate (III).

EXAMPLE 21

*6β-pyrrolidinomethyl - 11β,17α,21 - trihydroxy-1,4-pregnadiene-3,20-dione 17,21-diacetate (III)*

Following the procedure of Example 2 but substituting 3-methoxy - 11β,17α,21 - trihydroxy-1,3,5-pregnatrien-20-one 17,21-diacetate (I) and pyrrolidine (II), yields 6β-pyrrolidinomethyl - 11β,17α,21 - trihydroxy-1,4-pregnadiene-3,20-dione 17,21-diacetate (III).

EXAMPLE 22

*6β - (3 - ethylpyrrolidinomethyl) - 2α - methyl-11β,17α,21-trihydroxy-4-pregnene-3,20-dione 21-acetate (III)*

Following the procedure of Example 2 but substituting 3 - methoxy - 2α - methyl-11β,17α,21-trihydroxy-3,5-pregnadien-20-one 21-acetate (I) and 3-ethylpyrrolidine (II), yields 6β-(3-ethylpyrrolidinomethyl) - 2α - methyl - 11β,17α,21-trihydroxy-4-pregnene-3,20-dione 21-acetate (III).

EXAMPLE 23

*6β-(2,4-dimethylpyrrolidinomethyl)-11β,17α-dihydroxy-21-methyl-4-pregnene-3,20-dione (III)*

Following the procedure of Example 2 but substituting 3-ethoxy - 11β,17α - dihydroxy-21-methyl-3,5-pregnadien-20-one (I) and 2,4-dimethylpyrrolidine (II), yields 6β-(2,4-dimethylpyrrolidinomethyl)-11β,17α - dihydroxy-21-methyl-4-pregnene-3,20-dione (III).

EXAMPLE 24

*6β-diethylaminomethyl-21-fluoro-17α-hydroxy-4-pregnene-3,20-dione 17-acetate (III)*

Following the procedure of Example 2 but substituting 3-xylyloxy-21 - fluoro-17α-hydroxy-3,5-pregnadien-20-one 17-acetate (I) and diethylamine (II), yields 6β-diethylaminomethyl - 21 - fluoro - 17α-hydroxy-4-pregnene-3,20-dione 17-acetate (III).

EXAMPLE 25

*Methyl 6β-(N-phenyl-N-methylaminomethyl)3,11-dioxo-4,17(20)-pregnadien-21-oate (III)*

To 60 ml. of tetrahydrofuran containing 6.45 g. of methyl 3-methoxy-3,5,17(20)-pregnatrien-11-oxo-21-oate (I) is added 6 ml. of 37% Formalin, 2.0 ml. N-methyl aniline (II) and 100 mg. of p-toluenesulfonic acid. This mixture is stirred at room temperature for about 45 minutes and poured into very dilute sodium carbonate. The mixture is extracted with methylene chloride, dried over sodium sulfate and evaporated in vacuo to give a high yield of methyl 6β-(N-phenyl-N-methylaminomethyl-3,11-dioxo-4,17(20)-pregnadien-21-oate (III).

Using the procedure of Example 25 but substituting other compounds of Formula II, such as (1) N-ethyl aniline (II),
(2) diphenylamine (II),
(3) N-methyl-p-toluidine (II),
(4) N-ethyl-p-toluidine (II), etc., yields, respectively, (1) methyl 6β-N-(ethyl-N-phenylaminomethyl)-3,11-dioxo-4,17(20)-pregnadien-21-oate (III),
(2) methyl 6β-N,N-diphenylaminomethyl-3,11-dioxo-4,17(20)-pregnadien-21-oate (III),
(3) methyl 6β-(N-methyl-N-p-toluylaminomethyl)-3,11-dioxo-4,17(20)-pregnadien-21-oate (III),
(4) methyl 6β-(N-ethyl-N-p-toluylaminomethyl)-3,11-dioxo-4,17(20)-pregnadiene-21-oate (III), etc.

EXAMPLE 26

*6β-(N-methyl-N-phenylaminomethyl)-17α-hydroxy-4-pregnene-3,20-dione (III)*

Following the procedure of Example 25 but substituting 3-methoxy-17α-hydroxy - 3,5 - pregnadien-20-one (I) yields 6β-(N-methyl - N - phenylaminomethyl)-17α-hydroxy-4-pregnene-3,20-dione (III).

EXAMPLE 27

*Methyl 6β-(N-methyl-N-phenylaminomethyl)-3,11-dioxo-1,4,17(20)-pregnatriene-21-oate (III)*

Following the procedure of Example 25 but substituting methyl 1α,3-dimethoxy - 3,5,17(20) - pregnatrien-11-one-21-oate (I) yields 6β-(N-methyl-N-phenylaminomethyl) - 3,11 - dioxo - 1,4,17(20)-pregnatriene-21-oate (III).

EXAMPLE 28

*6β-(N-methylanilinomethyl)-17β-hydroxy-17α-methyl-4,9(11)-androstadien-3-one (III)*

Following the procedure of Example 25 but substituting 3-ethoxy - 17β - hydroxy-17α-methyl-3,5,9(11)-androstatriene (I) and N-methylaniline (II), yields 6β-(N-methylanilinomethyl)-17β-hydroxy - 17α - methyl - 4,9(11)-androstadien-3-one (III).

EXAMPLE 29

*6β-(N-methyl-p-toluidinomethyl) - 9α - fluoro - 11β,17α,21-trihydroxy-4-pregnene-3,20-dione 21-acetate (III)*

Following the procedure of Example 25 but substituting 3-anthryloxy - 9α - fluoro-11β,17α,21-trihydroxy-3,5-pregnadien-20-one 17-acetate (I) and N-methyl-p-toluidine (II), yields 6β-(N-methyl-p-toluidinomethyl)-9α-fluoro - 11β,17α,21 - trihydroxy - 4 - pregnene-3,20-dione 21-acetate (III).

EXAMPLE 30

*6β-diphenylaminomethyl-4-estrene-3,17-dione (III)*

Following the procedure of Example 25 but substituting 3-methoxy-3,5-estradien-17-one (I) and diphenylamine (II), yields 6β-diphenylaminomethyl-4-estrene-3,17-dione (III).

EXAMPLE 31

*6β-ethylphenylaminomethyl-17-oxa-D-homo-4-androstene-3,17-dione (III)*

Following the procedure of Example 25 but substituting 3 - methoxy-17-oxa-D-homo-3,5-androstadien-17-one (I) and ethylphenylamine (II), yields 6β-ethylphenylaminomethyl-17-oxa-D-homo-4-androstene - 3,17 - dione (III).

EXAMPLE 32

*6β-(N-methylanilinomethyl)-9β,10α-pregn-4-ene-3,20-dione (III)*

Following the procedure of Example 25 but substituting 3-ethoxy-9β,10α-pregna-3,5-dien-20-one (I) and N-methylaniline (II), yields 6β-(N-methylanilinomethyl)-9β,10α-pregn-4-ene-3,20-dione (III).

EXAMPLE 33

6β-(N-methyl-p-toluidinomethyl)-17α-hydroxy-16-methylene-4-pregnene-3,20-dione 17-acetate (III)

Following the procedure of Example 25 but substituting 3-isopropoxy-17α-hydroxy-16-methylene-3,5-pregnadien-20-one 17-acetate (I) and N-methyl-p-toluidine (II), yields 6β-(N-methyl))-p-toluidinomethyl)-17α-hydroxy-16-methylene-4-pregnene-3,20-dione 17-acetate (III).

I claim:
1. A process for the production of a steroid compound having in rings A and B of the steroid nucleus the structure:

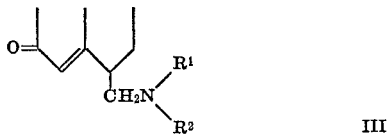

wherein R¹ and R² are independently selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, and R¹, R² and N when taken together form a secondary cyclic alkylene amino group containing from five through seven members, which comprises mixing a corresponding compound of the formula:

wherein R¹ and R² have the same meaning as above, with formaldehyde, a strong acid and a corresponding steroid compound having in rings A and B of the steroid nucleus the structure:

wherein R¹⁰ has the same meaning as above.

2. A process in accordance with claim 1 wherein the compound of Formula III is 6β-piperidinomethyl-17α-hydroxy-4-pregnene-3,20-dione 17-acetate, the compound of Formula II is piperidine and the compound of Formula I is 17α-hydroxy-3-methoxy-3,5-pregnadien-20-one 17-acetate.

3. A process in accordance with claim 1 wherein the compound of Formula III is 6β-N-methylanilinomethyl-17α-hydroxy-4-pregnene-3,20-dione, the compound of Formula II is N-methylaniline and the compound of Formula I is 3-methoxy-17α-hydroxy-3,5-pregnadien-20-one.

4. A process in accordance with claim 1 wherein the compound of Formula III is methyl 6β-N-methylanilinomethyl-3,11-dioxo-1,4,17(20)-pregnatrien-21-oate, the compound of Formula II is N-methylaniline and the compound of Formula I is methyl 1α,3-dimethoxy-3,5,17(20)-pregnatrien-11-on-21-oate.

5. A process in accordance with claim 1 wherein the compound of Formula III is methyl 6β-N-methylanilinomethyl-3,11-dioxo-4,17(20)-pregnatrien-21-oate, the compound of Formula II is N-methylaniline and the compound of Formula I is methyl 3-methoxy-3,5,17(20)-pregnadiene-11-on-21-oate.

6. A process in accordance with claim 1 wherein the compounds of Formulae I and II, formaldehyde and the strong acid are mixed together in tetrahydrofuran.

7. A steroid compound selected from the group consisting of the androstane, 19-norandrostane, 9β,10α-androstane, pregnane, 19-norpregnane, 9β,10α-pregnane, spirostane, cholestane, ergostane and stigmastane series having in rings A and B of the steroid nucleus the structure:

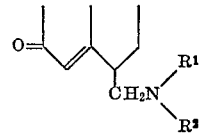

wherein R¹ and R² are independently selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, and R¹, R² and N when taken together form a secondary cyclic alkylene amino group containing from five through seven members.

8. 6β-(N-methyl-N-phenylaminomethyl)-17α-hydroxy-4-pregnene-3,20-dione.

9. Methyl 6β-(N-phenyl-N-methylaminomethyl)-3,11-dioxo-4,17(20)-pregnadien-21-oate.

References Cited

UNITED STATES PATENTS 3,242,169   3/1966   Petrow _____ 260—239.55

OTHER REFERENCES

Carrington et al.: Journ. Chem. Soc., 1962, pp. 1572–77.
Burn et al.: Tetrahedron, 1965, vol. 21, pp. 569–582.

LEWIS GOTTS, Primary Examiner

E. G. LOVE, Assistant Examiner

U.S. Cl. X.R.

260—239.55 A, 239.55 D, 397.1, 397.2, 397.3, 397.4, 397.45, 397.47, 999